(12) United States Patent
Furgiuele

(10) Patent No.: US 12,006,058 B2
(45) Date of Patent: Jun. 11, 2024

(54) FUEL PUMP MANAGEMENT SYSTEM AND METHOD OF OPERATING A FUEL PUMP MANAGEMENT SYSTEM

(71) Applicant: BOMBARDIER INC., Dorval (CA)

(72) Inventor: Vincenzo Furgiuele, Montreal (CA)

(73) Assignee: BOMBARDIER INC., Dorval (CA)

( * ) Notice: Subject to any disclaimer, the term of this patent is extended or adjusted under 35 U.S.C. 154(b) by 1004 days.

(21) Appl. No.: 16/850,361

(22) Filed: Apr. 16, 2020

(65) Prior Publication Data

US 2020/0262576 A1 Aug. 20, 2020

Related U.S. Application Data

(63) Continuation of application No. PCT/CA2018/051311, filed on Oct. 18, 2018.

(60) Provisional application No. 62/574,385, filed on Oct. 19, 2017.

(51) Int. Cl.
| | |
|---|---|
| *B64D 37/28* | (2006.01) |
| *B64D 37/00* | (2006.01) |
| *B64D 37/02* | (2006.01) |
| *B64D 37/32* | (2006.01) |

(52) U.S. Cl.
CPC ............ *B64D 37/28* (2013.01); *B64D 37/00* (2013.01); *B64D 37/005* (2013.01); *B64D 37/02* (2013.01); *B64D 37/32* (2013.01)

(58) Field of Classification Search
CPC ...... B64D 37/00; B64D 37/005; B64D 37/02; B64D 37/28; B64D 37/32; F02D 41/3082; F02D 33/006
See application file for complete search history.

(56) References Cited

U.S. PATENT DOCUMENTS

| | | | |
|---|---|---|---|
| 3,212,077 A * | 10/1965 | Edwards | G01F 23/263 |
| | | | 374/E1.004 |
| 3,800,816 A | 4/1974 | Follett | |
| 5,133,181 A | 7/1992 | Moore | |
| 5,723,870 A * | 3/1998 | Crowne | G01F 23/80 |
| | | | 250/221 |
| 6,837,688 B2 | 1/2005 | Kimberlin et al. | |
| 6,908,289 B2 | 6/2005 | Scanderbeg et al. | |

(Continued)

FOREIGN PATENT DOCUMENTS

| | | |
|---|---|---|
| CN | 101226074 A | 7/2008 |
| CN | 101280749 A | 10/2008 |

(Continued)

OTHER PUBLICATIONS

International Search Report and Written Opinion with regard to PCT/CA2018/051311 dated Jan. 22, 2019.

(Continued)

*Primary Examiner* — Loren C Edwards
(74) *Attorney, Agent, or Firm* — BCF LLP

(57) ABSTRACT

A method of and a system for operating a fuel pump management system of an aircraft. The method comprises receiving, from a fuel gauge, an electronic reading of a level of fuel fluid contained in a fuel tank; and analysing the electronic reading of the level of the fuel fluid, the analysing comprising upon determining that the level of fuel fluid is equal or below a predetermined fuel level threshold, causing a fuel pump in communication with the fuel tank to be shut down.

17 Claims, 4 Drawing Sheets

(56) References Cited

U.S. PATENT DOCUMENTS

| | | | |
|---|---|---|---|
| 7,352,550 | B2 | 4/2008 | Mladenik et al. |
| 7,393,185 | B2 | 7/2008 | Scanderbeg et al. |
| 8,474,437 | B2 | 7/2013 | Tsunooka |
| 8,733,398 | B2 | 5/2014 | Henson |
| 2003/0221674 | A1* | 12/2003 | Scanderbeg .......... F02D 41/406 123/479 |
| 2012/0173078 | A1* | 7/2012 | Everett ................. B64D 37/28 701/36 |
| 2014/0338752 | A1 | 11/2014 | Moreno et al. |
| 2015/0070036 | A1 | 3/2015 | Munk |
| 2015/0274096 | A1 | 10/2015 | Raniere |
| 2017/0166195 | A1* | 6/2017 | Jung ..................... B60W 20/40 |

FOREIGN PATENT DOCUMENTS

| | | |
|---|---|---|
| GB | 1153040 A | 5/1969 |
| GB | 2525414 A | 10/2015 |
| JP | 2007132267 A | 5/2007 |
| TW | M334884 U | 6/2008 |

OTHER PUBLICATIONS

Machine Translation of TWM334884 retrieved on https://twpat1.tipo.gov.tw/ on Apr. 15, 2020, pdf 16 pages.

"Fuel", 737-Classic 4-Tank Fuel Panel, http://www.b737.org.uk/fuel.htm#Pumps accessed on Apr. 14, 2020, pdf 12 pages.

Ctr fuel pump restriction on GND, 737NG [Archive]—PPRuNe Forums, https://www.pprune.org/archive/index.php/t-477280.html accessed on Apr. 14, 2020, pdf 7 pages.

Office Action with regard to the CN Patent Application No. CN201880067828.5 dated Dec. 1, 2022.

English Abstract for JP2007132267 retrieved on Espacenet on Jul. 19, 2023.

English Abstract for CN101280749 retrieved on Espacenet on Jul. 19, 2023.

English Abstract for CN101226074 retrieved on Espacenet on Jul. 19, 2023.

"Fuel System—Description", https//web.archive.org/web/20170424233225/http://craigmiddleton.co.uk/757/Biggles/www.crjesets.ca/z-Mcon/Hard2Find/B757/757_rr/fuel/description.html, accessed on Aug. 4, 2020, pdf 5 pages.

* cited by examiner

FUEL PUMP MANAGEMENT SYSTEM AND METHOD OF OPERATING A FUEL PUMP MANAGEMENT SYSTEM

CROSS-REFERENCE TO RELATED APPLICATIONS

The present application claims priority to U.S. Provisional Patent Application No. 62/574,385, filed Oct. 19, 2017, and is a continuation of International Patent Application No. PCT/CA2018/051311, filed Oct. 18, 2018, the entirety of both of which is incorporated herein by reference.

FIELD

The present technology relates to fuel pump management systems and methods for operating fuel pump management systems. In particular, the systems and methods allow analysing a level of fuel fluid to determine whether a fuel pump is to be shut down.

BACKGROUND

Operating aircraft at low fuel states may present risks of fuel tank ignitions. Without safeguard mechanisms, a fuel pump may keep operating even though a fuel tank to which it is fluidly connected is empty or close to be empty. Such situations may result in the fuel pump heating up thereby presenting a risk of failures and/or a risk of ignitions which, in turn, may result in a fire hazard at the aircraft level. As an example, such situations may occur when an aircraft is on the ground and maintenance personnel forget to turn the fuel pump off.

In order to mitigate risks associated with fuel pump overheating, multiple approaches have been investigated. Such approaches comprise imbedding one or more thermal switches and/or one or more thermal fuses in a stator wiring of the fuel pump. The thermal switch and/or the thermal fuse typically trigger upon being heated above a certain level. This approach may result, if detection of the triggering of the overheating has occurred, in a need to replace thermal switch and/or the thermal fuse or, if detection of the triggering of the overheating has not occurred, in a dormant failure of the thermal switch and/or the thermal fuse. As a result of these potential dormant failures, additional protections may be needed. Such additional protections may comprise imbedding a ground fault interrupter (GFI) or a fast acting arc fault interrupter (FAAF) in a circuitry of the fuel pump. Such additional protections may present shortcomings as a GFI does not (1) detect dry running of the fuel tank (i.e., it only protects against ignition from wire arcing when the fuel tank is empty) and (2) protect against foreign object damage (FOD) which may itself be an ignition source if lodged in an impeller during a dry running situation. Furthermore, additional wiring and/or testing may also be needed to demonstrate that the GFI and/of the FAAF are operational.

Alternatively, additional protections may also comprise imbedding dual fuses for each wire in the stator wiring of the fuel pump. Those approaches may however present shortcomings, amongst which, but without being limitative, adding components to the fuel system of the aircraft thereby adding complexity and/or weight.

A first alternative approach comprises the system and method described in U.S. Pat. No. 6,908,289 to Hydro-Aire, Inc. The system and method monitor fuel pressure within the fuel tank to shut-off the system if the pressure drops below a threshold value. The system and method attempt to automate shutting down of the fuel based on the fuel pump pressure levels.

A second alternative approach comprises the system and method described in U.S. Pat. No. 7,352,550 to TDG Aerospace, Inc. The system and method relate to a fault detection circuitry triggering a shutdown of a fuel pump.

Even though multiple approaches have been developed, improvements may nonetheless still be desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

In one aspect, various implementations of the present technology provide a fuel pump management system for an aircraft, the system comprising:
  a fuel gauge configured to electronically read a level of fuel fluid contained in a fuel tank;
  a fuel pump in fluid communication with the fuel tank and a power unit to be alimented in fuel fluid; and
  a controller connected to the fuel gauge and the fuel pump, the controller being configured to (1) analyse the level of fuel fluid read by the fuel gauge and (2) upon determining that the level of fuel fluid is equal or below a predetermined fuel level threshold, cause the fuel pump to be shut down.

In another aspect, the fuel gauge is located within the fuel tank.

In yet another aspect, the fuel gauge comprises at least one of a capacitance probe and a proximity sensing unit.

In another aspect, the fuel gauge comprises at least one of an ultrasonic transducer, a magnetoresistive level transmitter, a laser transmitter and a guided wave radar.

In yet another aspect, the fuel gauge is configured to transmit one or more readings of the level of fuel fluid contained in the fuel tank to the fuel controller.

In another aspect, the predetermined fuel level threshold is a minimum threshold determined so that the fuel pump is not subjected to one of a drop of fuel pressure and foreign object ignition before being shut down.

In yet another aspect, shutting down the fuel pump comprises switching off current flowing to the fuel pump.

In another aspect, the fuel pump comprises a solenoid and wherein shutting down the fuel pump comprises sending a signal to the solenoid so that the solenoid causes switching off current flowing to the fuel pump.

In yet another aspect, prior to causing the fuel pump to be shut down, the controller determines whether an aircraft in which the fuel pump management system is installed is on the ground.

In another aspect, the power unit is one of an aircraft engine and an auxiliary power unit (APU).

In another aspect, various implementations of the present technology provide a method of operating a fuel pump management system of an aircraft, the method comprising:
  receiving, from a fuel gauge, an electronic reading of a level of fuel fluid contained in a fuel tank; and
  analysing the electronic reading of the level of the fuel fluid, the analysing comprising:

upon determining that the level of fuel fluid is equal or below a predetermined fuel level threshold, causing a fuel pump in communication with the fuel tank to be shut down.

In another aspect, the fuel gauge is located within the fuel tank.

In yet another aspect, the fuel gauge comprises at least one of a capacitance probe and a proximity sensing unit.

In another aspect, the fuel gauge comprises one of an ultrasonic transducer, a magnetoresistive level transmitter, a laser transmitter and a guided wave radar.

In yet another aspect, the fuel gauge is configured to transmit one or more readings of the level of fuel fluid contained in the fuel tank to the fuel controller.

In another aspect, the predetermined fuel level threshold is a minimum threshold determined so that the fuel pump is not subjected to one of a drop of fuel pressure and foreign object ignition before being shut down.

In yet another aspect, shutting down the fuel pump comprises switching off current flowing to the fuel pump.

In another aspect, the fuel pump comprises a solenoid and wherein shutting down the fuel pump comprises sending a signal to the solenoid so that the solenoid causes switching off current flowing to the fuel pump.

In yet another aspect, prior to causing the fuel pump to be shut down, the controller determines whether an aircraft in which the fuel pump management system is installed is on the ground.

In another aspect, various implementations of the present technology provide a controller comprising a processor and a non-transitory computer-readable medium, the non-transitory computer-readable medium comprising control logic which, upon execution by the processor, causes operating a fuel pump management system of an aircraft.

In other aspects, various implementations of the present technology provide a non-transitory computer-readable medium storing program instructions for operating a fuel pump management system of an aircraft, the program instructions being executable by a processor of a computer-based system to carry out one or more of the above-recited methods.

In other aspects, various implementations of the present technology provide a computer-based system, such as, for example, but without being limitative, an electrical system controller comprising at least one processor and a memory storing program instructions for operating a fuel pump management system of an aircraft, the program instructions being executable by the at least one processor of the electrical system controller to carry out one or more of the above-recited methods.

In the context of the present specification, unless expressly provided otherwise, a computer system may refer, but is not limited to, an "electronic device", a "controller", a "fuel controller", a "control computer", a "control system", a "computer-based system", a "fuel management system" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
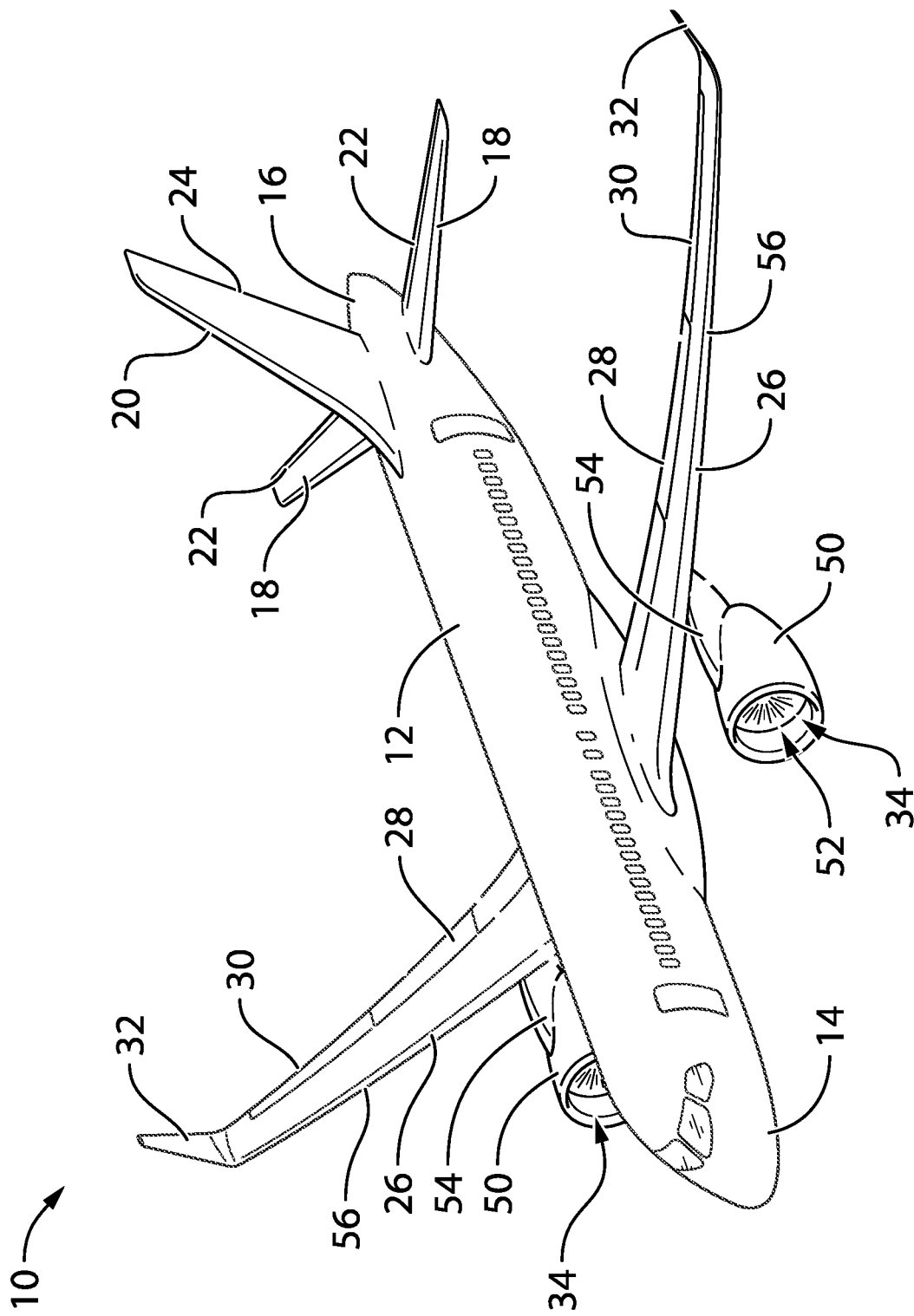
FIG. 1 is a perspective view taken from a top, front, left side of an aircraft.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "controller", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term "processor" or "controller" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown an aircraft 10. The aircraft 10 is an exemplary implementation of an aircraft and other types of aircraft are contemplated. The aircraft 10 has a fuselage 12, a cockpit 14 at a front of the fuselage 12 and a tail 16 at a rear of the fuselage 12. The tail 16 has left and right horizontal stabilizers 18 and a vertical stabilizer 20. Each horizontal stabilizer 18 is provided with an elevator 22 used to control the pitch of the aircraft 10. The vertical stabilizer 20 is provided with a rudder 24 used to control the yaw of the aircraft 10. The aircraft 10 also has a pair of wings 26. The left wing 26 is connected to the fuselage 12 and extends on a left side thereof. The right wing 26 is connected to the fuselage 12 and extends on a right side thereof. The wings 26 are provided with flaps 28 and ailerons 30. The flaps 28 are used to control the lift of the aircraft 10 and the ailerons 30 are used to control the roll of the aircraft 10. Optionally, each wing 26 is provided with a winglet 32 at a tip thereof. Left and right engine assemblies 34 are connected to a bottom of the left and right wings 26 respectively, as will be described in greater detail below. It is contemplated that more than one engine assembly 34 could be connected to each wing 26. The aircraft 10 is provided with many more components and systems, such as a landing gear and auxiliary power unit, which will not be described herein.

Figure 2:
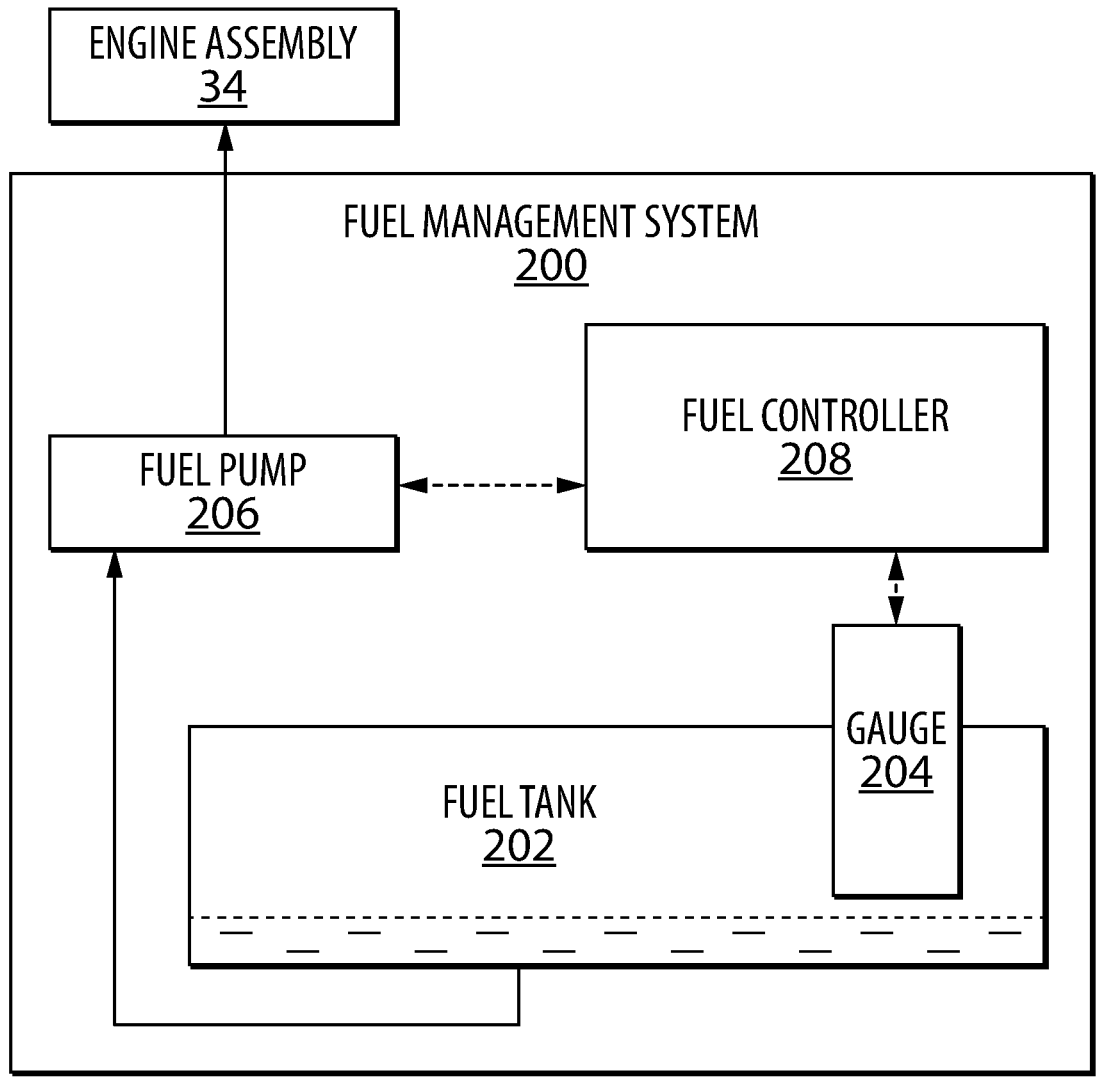
FIG. 2 is a diagram of a fuel management system in accordance with an embodiment of the present technology.

Referring now concurrently to FIGS. 1 and 2, the left engine assembly 34 and a fuel management system 200 will be described in more detail. As the right engine assembly 34 is similar to the left engine assembly 34, it will not be described in detail herein. Elements of the right engine assembly 34 that correspond to those of the left engine assembly 34 have been labeled with the same reference in the figures.

The left engine assembly 34 has a nacelle 50 inside which is an engine 52. In the present implementation, the engine 52 is a turbofan engine such as the Pratt & Whitney™ PW1500G™ turbofan engine. It is contemplated that other turbofan engines could be used. It is also contemplated that an engine other than a turbofan engine could be used.

A pylon 54 is connected between the nacelle 50 and a bottom of the left wing 26, thereby connecting the engine 52 to the left wing 26. The pylon 54 extends along a top of the nacelle 50. A majority of the pylon 54 extends forward of a leading edge 56 of the left wing 26. The top, rear portion of the pylon 54 connects to the bottom, front portion of the wing 26.

As can be seen in FIG. 2, the engine assembly 34 is also fluidly connected to the fuel management system 200. In some embodiments, the fuel management system 200 may equally be referred to as an aircraft fuel system. Broadly speaking the fuel management system 200 may rely on systems and control logic to pump, manage and deliver fuel fluid (equally referred to as jet fuel) so as to ensure that the engine assembly 34 receives a proper amount of fuel fluid at any stage of operations of the aircraft. Such stage of operations may comprise operations while the aircraft is stationary on the ground, taxiing and/or in-flight (e.g., during take-off, cruise and/or landing). In some embodiments, the fuel management system 200 may comprise additional functionalities, such as, but without being limitative, management of a center of gravity of the aircraft by dynamically adjusting allocation of fuel fluid in each one of the fuel tanks. The fuel management system 200 may also comprise other functionalities which may become apparent to the person skilled in the art of the present technology.

In the illustrated embodiment, the fuel management system 200 comprises a fuel tank 202, one or more fuel gauges 204, one or more fuel pumps 206 and one or more fuel controllers 208. Additional systems and components may also be part of the fuel management system 200 such as fuel pipes and fuel valves. Such additional systems and components may become readily apparent to the person skilled in the art of the present technology.

The number of fuel tanks, fuel gauges and fuel pumps may vary depending on the configuration of the aircraft. In some embodiments, each fuel tank is associated with a corresponding fuel pump and a corresponding fuel gauge. In some alternative embodiments, each fuel tank may be associated with a plurality of fuel pumps and/or fuel gauges. In some embodiments, a plurality of fuel tanks may be distributed across the aircraft, such as, but without being limitative, in the wings and/or in the fuselage (e.g., within the belly fairing). In some alternative embodiments, such as in fighter jets, the fuel tanks may be located externally (e.g., drop tanks attached to a wing).

In some embodiments, the fuel tank 202 is "built-in" a structure of the aircraft that is sealed to allow fuel storage.

As previously mentioned, the fuel tank 202 may be located at various portions of the aircraft, such as, but without being limitative, in the wings, in the fuselage and/or empennage of the aircraft.

In some embodiments, the fuel gauge 204 is installed with respect to the fuel tank 202 so as to read a level of fuel fluid contained in the fuel tank 202. In some embodiments, the fuel gauge 204 may equally be referred to as a sensor and/or a probe. In some embodiments, the fuel gauge 204 is located within the fuel tank 202. In some embodiments, the fuel gauge 204 is integrally formed with the fuel tank 202. In some embodiments, the fuel gauge 204 is configured so as to allow a direct reading of the level of the fuel fluid. In some embodiments, the reading of the level is done directly and electronically thereby allowing to accurately determine a level of the fuel level. In some embodiments, the electronic reading allows a degree of accuracy that would have other not be possible with conventional gauges, such as mechanical probes.

In some embodiments, the fuel gauge 204 may comprise a capacitance probe and/or proximity sensing unit. In some embodiments, the fuel gauge 204 may comprise an ultrasonic transducer, a magnetoresistive level transmitter, a laser transmitter and/or a guided wave radar.

In some embodiments, the fuel gauge 204 may comprise various types of fuel-immersed gauges, sensors and/or probes. In some embodiments, the fuel gauge 204 may comprise one or more probes that consist of two concentric metallic cylinders that are mounted vertically onto a structure of the fuel tank 202. The probes measure a fuel height at the probe locations. When no fuel is present, the probes may record dry capacitance of surrounding air. The dry capacitance may be different from probe to probe as it depends on the height of the probes. Probe heights may differ within the fuel tank because of the structural design of the fuel tank 202 (e.g., wing tank, fuselage tank). When fuel is introduced into the fuel tank 202, a space between the concentric cylinders fills up with fuel fluid thereby changing the capacitance measured by the probes. The change in capacitance may be recorded by the probes and may be proportional to a fuel height. Various methods may then be relied upon to calculate a volume from this measurement. One such method comprises recording the fuel height and calculate a volume of fuel fluid based on modeling a plane of fuel fluid using at least three points (i.e., at least three probes within the fuel tank 202). The volume of fuel fluid may then be relied upon to determine a quantity of fuel fluid inside the fuel tank 202. In some embodiments, a fuel density may also be determined by inputting a constant value within the control software and/or measuring the fuel density inside the fuel tank 202. In some embodiments, the fuel density may be measured by using permittivity and/or by using a densitometer. The fuel density may be relied upon to convert the fuel volume to fuel mass.

In some embodiments, when the fuel level reaches a low level, a single probe located at low point of the fuel tank 202 may be relied upon to trigger low fuel quantity. If fuel fluid level is below a threshold, then determination may be made that one or more fuel pumps is to be shut down. In some embodiments, low fuel level sensing may be implemented via electrical float switches and/or thermistor type sensors.

In some embodiments, the fuel gauge 204 allows electronical reading of the level at a given frequency. In some embodiments, the electronical reading is continuous and in real time. In such embodiments, the fuel gauge 204 may continuously transmit readings of the level of fuel fluid to the fuel controller 208.

In some embodiments, the fuel pump 206 may be an electric pump fluidly connected to the fuel tank 202 so as to pump fuel fluid from the fuel tank 202 to the engine assembly 34. In some embodiments, the fuel pump 206 may equally pump fuel fluid from the fuel tank 202 to the APU without departing from the scope of the present technology. In some embodiments, the fuel pump 206 may be electrically controlled through a solenoid electrically connected to the fuel controller 208. Further details as to how the fuel pump 206 may be implemented will become apparent to the person skilled in the art of the present technology.

In some embodiments, the fuel controller 208 may be connected to the fuel gauge 204 and/or the fuel pump 206 either via wires or wirelessly. In some embodiments, the fuel controller 208 is part of the avionics of the aircraft. In some alternative embodiments, the fuel controller 208 may be an independent component or may be part of a system operating control logic so as to implement a fuel controller 208. Further details as to how the fuel controller 208 may be implemented is further described in connection with the description of FIG. 3.

In some embodiments, the fuel controller 208 executes control logic so as to receive readings from one or more fuel gauge 204 and analyse the readings. In some embodiments, the analysis further comprises comparing the level of fuel fluid (read by the one or more fuel gauge 204) with a threshold. In some embodiments, the threshold may be a predetermined value. In some embodiments, the predetermined value is associated with a volume unit (e.g., liter).

In some embodiments, the predetermined value may be edited by a user (e.g., a pilot, a co-pilot, maintenance personnel). In some embodiments, the predetermined value may be automatically calculated and/or dynamically adjusted by the fuel controller 208 and/or one or more systems of the avionics. The predetermined threshold is a minimum threshold determined so that the fuel pump is not subjected to a drop of fuel pressure and/or foreign object ignition before being shut down. In some embodiments, each one of the one or more fuel pumps 206 and/or each one of the one or more fuel tanks 202 may be associated with a corresponding predetermined threshold and/or a corresponding fuel controller 208. As an example, a first fuel tank may be associated with two fuel pumps and one fuel controller. In such an example, a single threshold may be relied upon by the fuel controller to determine whether the two fuel pumps have to be shut down. In other embodiments, distinct threshold may be relied upon for each one of the two fuel pumps. In other embodiments, the fuel controller may be associated with multiple fuel pumps installed in distinct fuel tanks. Multiple variations may therefore be envisioned without departing from the scope of the present technology.

In some embodiments, upon determining that the level of fuel fluid is equal or below the threshold, the fuel controller 208 causes the one or more fuel pumps 206 to shut down. In some embodiments, causing the one or more fuel pumps 206 to shut down comprises issuing a signal to an electric control system of the aircraft to shut down the one or more fuel pumps 206. In some embodiments, causing the one or more fuel pumps 206 to shut down comprises switching off current flowing to the fuel pump. In some embodiments, the one or more fuel pumps 206 comprise a solenoid and causing the one or more fuel pumps 206 to shut down comprises sending a signal to the solenoid so that the solenoid causes switching off current flowing to the one or more fuel pumps 206. In some embodiments, the fuel controller 208 is electrically connected to the one or more fuel pumps 206 directly or indirectly (e.g., via a relay in an electrical junction box).

In some embodiments, the fuel controller 208 determines whether the aircraft is on the ground or in-flight. In some embodiments, the fuel controller 208 not only determines whether the aircraft is on the ground but also whether the aircraft is taxiing or not. In some embodiments, determining whether the aircraft is on the ground or in-flight is based on readings obtained from the one or more landing gears of the aircraft (e.g., weight on wheels determination). In some embodiments, the fuel controller 208 causes the one or more fuel pumps 206 to shut down only if it has previously determined that the aircraft is on the ground. Such embodiments allow providing hazard protection during maintenance operations while ensuring that the one or more fuel pumps 206 remain operational during taxiing and/or in-flight even though the level of fuel fluid is equal or below the threshold.

Amongst multiple benefits, the fuel management system 200 described in the paragraphs above may allow (1) increasing reliability by limiting tripping of the thermal switches and/or one of the thermal fuses of the fuel pumps; (2) avoiding a necessity to include one or more GFIs in the fuel pumps; (3) reducing chances of inadvertent dry running of the fuel pumps; and/or (4) automatically shutting down one or more fuel pumps before the one or more fuel pump be subjected to a drop of fuel pressure and/or foreign object ignition before being shut down.

Figure 3:
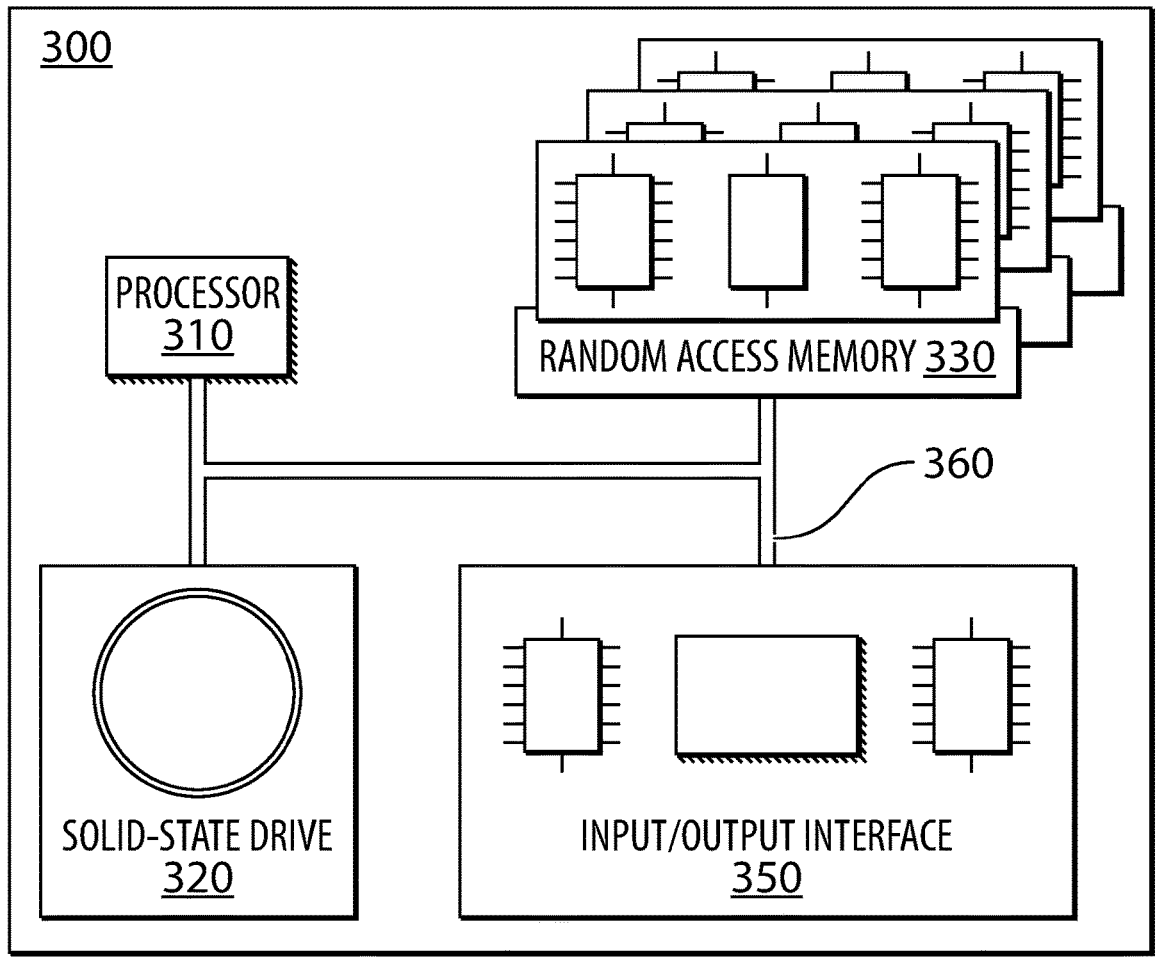
FIG. 3 is a diagram of a computing environment in accordance with an embodiment of the present technology.

Turning now to FIG. 3, a diagram of a computing environment 300 in accordance with an embodiment of the present technology is shown. In some embodiments, the computing environment 300 may be implemented by the fuel controller 208. In some embodiments, the computing environment 300 comprises various hardware components including one or more single or multi-core processors collectively represented by a processor 310, a solid-state drive 320, a random access memory 330 and an input/output interface 350. The computing environment 300 may be a computer specifically designed for installation into an aircraft. In some alternative embodiments, the computing environment 300 may be a generic computer system adapted to meet certain requirements, such as, but not limited to, certification requirements. The computing environment 300 may be an "electronic device", a "controller", a "control computer", a "control system", a "computer-based system", a "fuel controller", a "fuel management system" and/or any combination thereof appropriate to the relevant task at hand. In some embodiments, the computing environment 300 may also be a sub-system of one of the above-listed systems. In some other embodiments, the computing environment 300 may be an "off the shelf" generic computer system. In some embodiments, the computing environment 300 may also be distributed amongst multiple systems. The computing environment 300 may also be specifically dedicated to the implementation of the present technology. As a person in the art of the present technology may appreciate, multiple variations as to how the computing environment 300 is implemented may be envisioned without departing from the scope of the present technology.

Communication between the various components of the computing environment 300 may be enabled by one or more internal and/or external buses 360 (e.g. a PCI bus, universal serial bus, IEEE 1394 "Firewire" bus, SCSI bus, Serial-ATA bus, ARINC bus, etc.), to which the various hardware components are electronically coupled.

The input/output interface 350 may be coupled directly and/or indirectly to the one or more fuel gauges 204 and/or the one or more fuel pumps 206 and/or other control systems of the aircraft (e.g., the avionics of the aircraft).

According to implementations of the present technology, the solid-state drive 320 stores program instructions suitable for being loaded into the random access memory 330 and executed by the processor 310 for operating a fuel pump management system. For example, the program instructions may be part of a library or an application.

In some embodiments, the computing environment 300 may be configured so as to analyse the reading of the level of the fuel fluid and, upon determining that the level of fuel fluid is equal or below a predetermined fuel level threshold, cause a fuel pump in communication with the fuel tank to be shut down.

Figure 4:
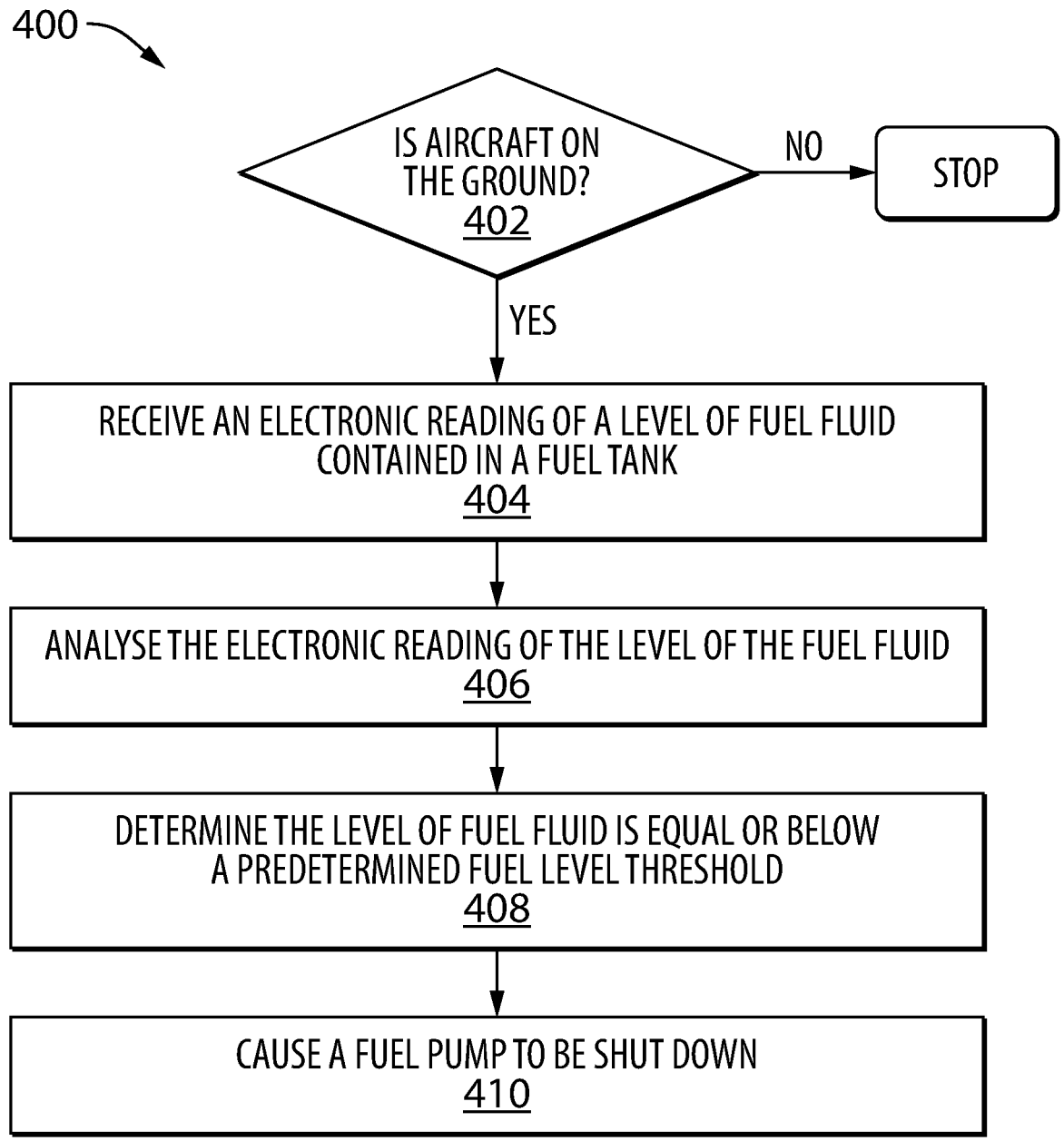
FIG. 4 is a diagram illustrating a flowchart illustrating a computer-implemented method implementing embodiments of the present technology.

Turning now to FIG. 4, a flowchart illustrating a computer-implemented method 400 of operating a fuel pump management system is illustrated. In some embodiments, the computer-implemented method 400 may be (completely or partially) implemented on the fuel controller 208 and/or the fuel management system 200.

The method 400 may start at step 402 by determining whether the aircraft is on the ground. If the determination concludes that the aircraft is on the ground, then the method 400 proceeds to step 404. If the determination concludes that the aircraft is not on the ground, then the method 400 stops. In some embodiments, the step 402 may be optional and the method 400 may directly start at step 404. In some embodiments, the step 402 may further comprise determining whether the aircraft is stationary or taxiing. At step 404, the method 400 executes receiving, from a fuel gauge, an electronic reading of a level of fuel fluid contained in a fuel tank. In some embodiments, the fuel gauge is located within the fuel tank. In some embodiments, the fuel gauge comprises at least one of a capacitance probe and a proximity sensing unit. In some embodiments, the fuel gauge comprises at least one of an ultrasonic transducer, a magnetoresistive level transmitter, a laser transmitter and a guided wave radar. In some embodiments, the fuel gauge is configured to transmit one or more readings of the level of fuel fluid contained in the fuel tank to the fuel controller.

Then, at a step 406, the method 400 analyses the electronic reading of the level of the fuel fluid. In some embodiments, the step 406 comprises steps 408 and 410. The step 408 comprises determining that the level of fuel fluid is equal or below a predetermined fuel level threshold. If the determination concludes that the level of fuel fluid is equal or below a predetermined fuel level threshold, then the method 400 proceeds to the step 410 by causing a fuel pump in communication with the fuel tank to be shut down. In some embodiments, the predetermined fuel level threshold is a minimum threshold determined so that the fuel pump is not subjected to one of a drop of fuel pressure and foreign object ignition before being shut down. In some embodiments, shutting down the fuel pump comprises switching off current flowing to the fuel pump. In some embodiments, the fuel pump comprises a solenoid and shutting down the fuel pump comprises sending a signal to the solenoid so that the solenoid causes switching off current flowing to the fuel pump.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A fuel pump management system for an aircraft, the system comprising:
   a fuel gauge configured to electronically read a level of fuel fluid contained in a fuel tank;
   a fuel pump in fluid communication with the fuel tank and a power unit to be alimented in fuel fluid, the fuel pump avoiding inclusion of a ground fault interrupter in said fuel pump; and
   a controller connected to the fuel gauge and the fuel pump, the controller being configured to (1) analyze the level of fuel fluid read by the fuel gauge and (2) upon determining that the level of fuel fluid is equal or below a predetermined fuel level threshold, cause the fuel pump to be shut down, wherein prior to causing the fuel pump to be shut down, the controller determines whether the aircraft in which the fuel pump management system is installed is on the ground, and wherein the controller causes the fuel pump to shut down only if it has previously determined that the aircraft is on the ground, and wherein the fuel pump remains operational during taxiing or in-flight even though the level of fuel fluid is equal or below the threshold.

2. The fuel pump management system of claim 1, wherein the fuel gauge is located within the fuel tank.

3. The fuel pump management system of claim 1, wherein the fuel gauge comprises at least one of a capacitance probe and a proximity sensing unit.

4. The fuel pump management system of claim 1, wherein the fuel gauge comprises at least one of an ultrasonic transducer, a magnetoresistive level transmitter, a laser transmitter and a guided wave radar.

5. The fuel pump management system of claim 1, wherein the fuel gauge is configured to transmit one or more readings of the level of fuel fluid contained in the fuel tank to the controller.

6. The fuel pump management system of claim 1, wherein the predetermined fuel level threshold is a minimum threshold determined so that the fuel pump is not subjected to one of a drop of fuel pressure and a foreign object ignition before being shut down.

7. The fuel pump management system of claim 1, wherein shutting down the fuel pump comprises switching off current flowing to the fuel pump.

8. The fuel pump management system of claim 1, wherein the fuel pump comprises a solenoid and wherein shutting down the fuel pump comprises sending a signal to the solenoid so that the solenoid causes switching off current flowing to the fuel pump.

9. The fuel pump management system of claim 1, wherein the power unit is one of an aircraft engine and an auxiliary power unit (APU).

10. A method of operating a fuel pump management system of an aircraft, the method comprising:
    receiving, from a fuel gauge, an electronic reading of a level of fuel fluid contained in a fuel tank;
    determining whether the aircraft in which the fuel pump management system is installed is on the ground; and
    analyzing the electronic reading of the level of the fuel fluid, the analyzing comprising:
        upon determining that the level of fuel fluid is equal or below a predetermined fuel level threshold and that the aircraft is on the ground, causing a fuel pump in communication with the fuel tank to be shut down, wherein the fuel pump avoids inclusion of a ground fault interrupter in said fuel pump, and wherein the fuel pump remains operational during taxiing or in-flight even though the level of fuel fluid is equal or below the threshold.

11. The method of claim 10, wherein the fuel gauge is located within the fuel tank.

12. The method of claim 10, wherein the fuel gauge comprises at least one of a capacitance probe and a proximity sensing unit.

13. The method of claim 10, wherein the fuel gauge comprises one of an ultrasonic transducer, a magnetoresistive level transmitter, a laser transmitter and a guided wave radar.

14. The method of claim 10, wherein the fuel gauge is configured to transmit one or more readings of the level of fuel fluid contained in the fuel tank to a fuel controller.

15. The method of claim 10, wherein the predetermined fuel level threshold is a minimum threshold determined so that the fuel pump is not subjected to one of a drop of fuel pressure and a foreign object ignition before being shut down.

16. The method of claim 10, wherein shutting down the fuel pump comprises switching off current flowing to the fuel pump.

17. The method of claim 10, wherein the fuel pump comprises a solenoid and wherein shutting down the fuel pump comprises sending a signal to the solenoid so that the solenoid causes switching off current flowing to the fuel pump.

* * * * *